United States Patent Office 3,733,258
Patented May 15, 1973

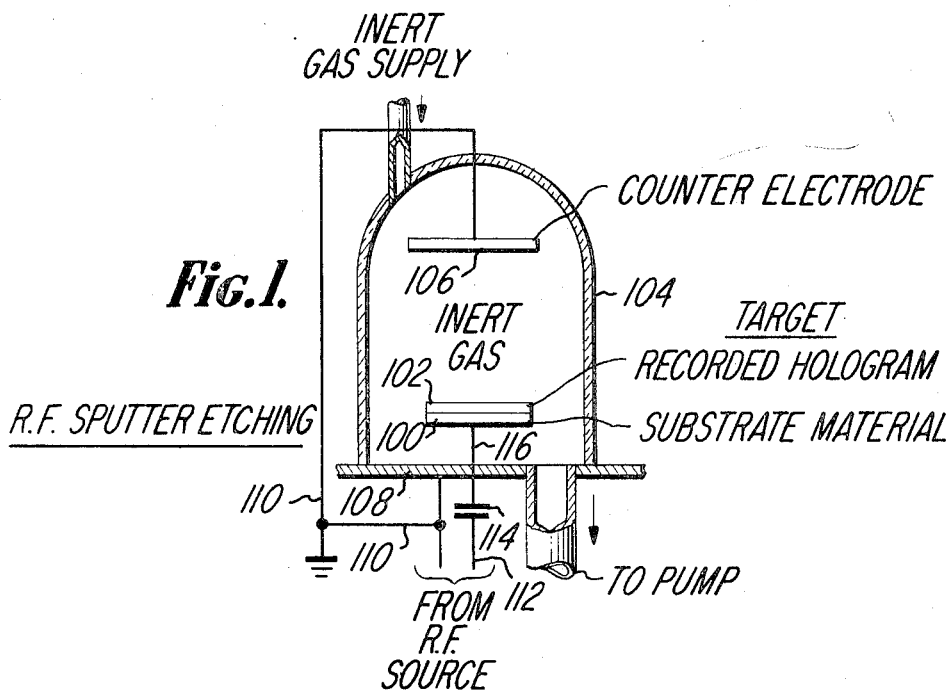
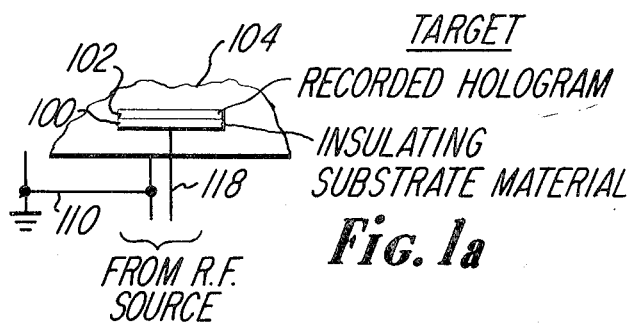
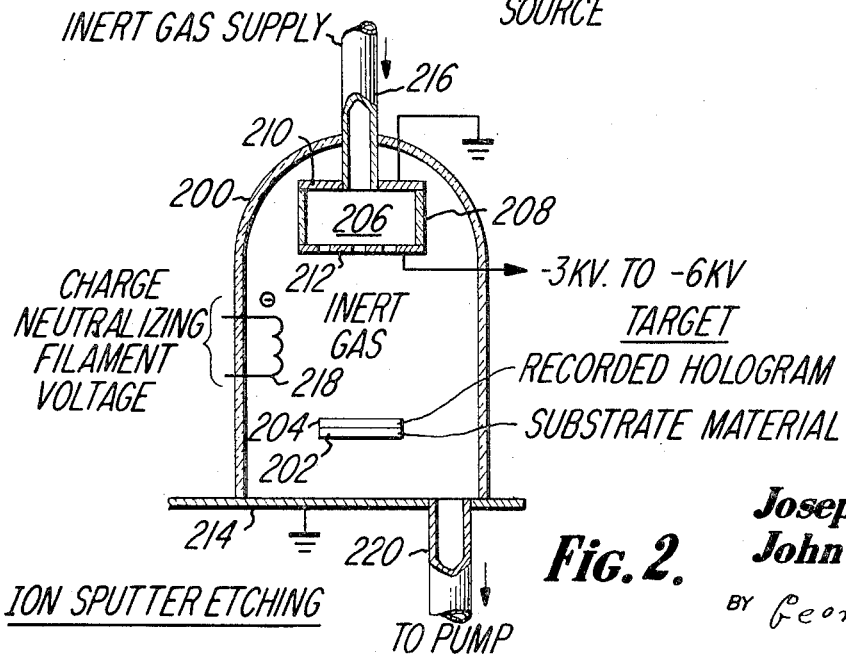

3,733,258
SPUTTER-ETCHING TECHNIQUE FOR RECORDING HOLOGRAMS OR OTHER FINE-DETAIL RELIEF PATTERNS IN HARD DURABLE MATERIALS
Joseph John Hanak, Trenton, N.J., and John Patrick Russell, Thalwil, Switzerland, assignors to RCA corporation, New York, N.Y.
Filed Feb. 3, 1971, Ser. No. 112,273
Int. Cl. C23c *15/00*
U.S. Cl. 204—192          10 Claims

ABSTRACT OF THE DISCLOSURE

Sputter etching has been found to be capable of transferring holograms recorded on a photosensitive surface layer covering an underlying substrate material from the layer to the substrate material itself. The transferred hologram is in the form of a relief pattern. This technique provides both high fidelity and high resolution capabilities in both the depth dimension and in the surface dimensions of the transferred relief-pattern hologram, which are in the order of one micron or less, and is applicable to other fine-detail relief patterns.

---

This invention relates to a sputter-etching technique and, more particularly to such a technique for providing a holographic relief pattern, or other type of relief pattern having similar fine detail, in a substrate material, which material is preferably hard and durable.

As is known, a hologram containing the spatial information of an object is normally recorded on or in a photosensitive material, such as a photographic emulsion or a photoresist for example, by simultaneously illuminating the photosensitive material with a first component of coherent light which has been spatially modulated in intensity by the object and by a second component of this coherent light which is spatially unmodulated and which arrives at the photosensitive material with an angular displacement with respect to the first component. This results in the recording of an interference fringe pattern, called a hologram, which recorded hologram may be employed to reconstruct an image of the object by diffracting a readout beam of light incident thereon.

The hologram may be considered to be a spatial-carrier frequency which may be modulated both in amplitude and/or phase by a two dimensional spatial complex wave whose characteristics are determined by the object. The wavelength of the carrier frequency itself is determined both by the wavelength of the coherent light and the angular displacement between the incident interfering first and second components of the coherent light. In practice, the spatial wavelength of the carrier frequency is in the order of one micron or less, while the modulation components, manifested by a variation in the amplitude and/or frequency of this carrier wavelength from point to point, include values which are significantly smaller than one micron.

There are different types of holograms consisting of a density hologram, a phase hologram, or a combination thereof. In a density hologram, as exemplified by a hologram recorded on a photographic emulsion, the relative amplitude of the spatial signal at any point is a function of the density of the emulsion at that point. Thus, maxima and minima of the hologram interference pattern may be manifested by relatively dark and light densities, or vice versa. In phase holograms, as exemplified by developed photoresists where the hologram is manifested by a relief pattern, the relative amplitude of the spatial signal at any point is a function of the depth of that point with respect to the ground of the pattern. Thus, in a relief-pattern phase hologram the maxima and minima of the holographic interference pattern may be represented by relatively high and relatively low points of the relief pattern, or vice versa.

Alternatively, a phase hologram may comprise a transmissive medium of fixed thickness, whose index of refraction varies from point to point in accordance with the relative amplitude of the recorded hologram at that point.

Each of these three ways of manifesting the amplitude of the spatial signal from point to point is not exclusive, so that a hologram could manifest relative amplitude of the spatial signal from point to point by a combination of any two or three of the density, depth and/or index of refraction of the recording medium at each point of the hologram.

Regardless of whether a hologram is a density hologram, a relief pattern phase hologram, a refractive index phase hologram or a combination of one or more of the aforesaid, the phase and frequency parameters of the spatial signal are manifested in accordance with the spacing distance between adjacent maxima and minima.

As is known, sputter-etching is a technique for removing molecules of a solid target material by means of bombardment with high kinetic energy ions of a gas glow discharge. In a manner of speaking, sputter etching may be compared to sand blasting, but on a microscopic scale.

In the past, sputter etching has been employed for etching patterns on a target material by covering the target material with a mask having one or more openings therein in the shape of the desired pattern to be etched. The mask permits the entire portion of the target material delineated by the mask openings to be sputter etched at the same rate. Therefore, the target material in cooperative relationship with any one mask opening is etched uniformly, so that the depth of this etched portion with respect to the original surface of the target material is substantially uniform over its entire area. Therefore, sputter etching was employed in the past merely to delineate the pattern defined by the shape of the periphery of a mask opening, and not to provide additional information by modulating the depth of the sputtered area with respect to the ground in accordance with an information-bearing signal.

In accordance with the present invention, it has been found that sputter etching is suitable for preparing a relief pattern engraving, such as a relief pattern phase hologram, composed of a high resolution, high fidelity spatial signal pattern. In fact, such spatial signal pattern may include spatial frequency signal components in both the breadth and depth dimensions of the relief pattern in the order of one micron or less.

The features and advantages of the present invention will become more apparent from the following detailed description, taken together with the accompanying drawing in which:

FIG. 1 illustrates a first embodiment of the invention in which R.F. sputter etching is employed for transferring a recorded hologram to a substrate material which may be either a conductor or an insulator;

FIG. 1a illustrates a modification of FIG. 1 which may be employed for transferring a recorded hologram only to an insulating substrate material;

FIG. 2 illustrates ion sputter etching apparatus which may be employed for transferring a recorded hologram to a substrate material which may be either a conductor or an insulator.

Figure 3A:
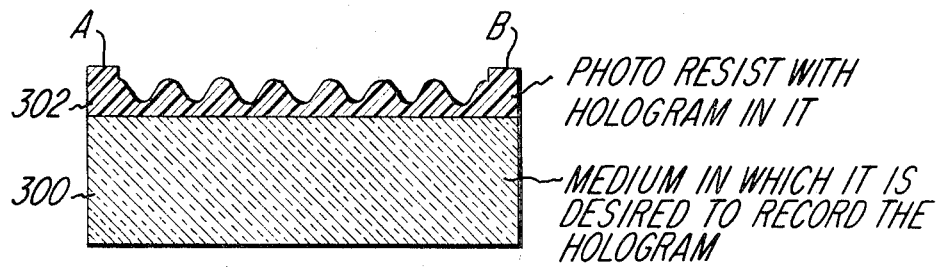
FIGS. 3a, 3b, and 3c illustrate the manner in which a recorded hologram is transferred to a substrate material by sputter etching.

Referring now to FIG. 1, a target which comprises a substrate material 100 covered by layer 102 having a hologram recorded thereon is placed in bell jar 104. Substrate 100 is preferably composed of a hard durable material, which may be a glassy media comprising fused silica, silicate glasses of borosilicate glasses, for instance; or, alternatively, a dense ceramic material; a single crystal refractory metal oxide including sapphire, alumina, magnesium oxide, spinels, garnets, zirconia, titania, thoria, strontium titanate and berylia, for instance; or a refractory metal including nickel, chromium, molybdenum, tungsten, vanadium, stainless steel, and non-corrosive alloys of nickel, chromium and iron, for instance. Layer 102, which initially includes a recorded hologram, may be either a positive or negative photoresist (although a positive photoresist is easier to work with) or may be a bleached or unbleached developed photographic emulsion, by way of example.

Bell jar 104 is supplied with an inert gas, such as argon for example, and, at the same time, is pumped out by a vacuum pump, not shown, at a rate which maintains a dynamic equilibrium pressure at a suitable value in the range between 1–20 microns.

Included within bell jar 104 in spaced relationship with respect to substrate 100 is counterelectrode 106, which, along with the metal bottom plate 108 of bell jar 104, is grounded, as shown, through conductor 110. An R.F. source, not shown, having a suitable peak voltage in the range between 200–1,000 volts with respect to ground potential, and a suitably high frequency of preferably many mHz., such as 13.56 mHz., for instance, is applied to substrate 100 through conductor 112, coupling capacitance 114 and conductor 116.

The arrangement shown in FIG. 1 is suitable for both insulating and conducting substrate materials. However, as shown in FIG. 1a, in the case where the target substrate material 100 is an insulator, coupling capacitance 114 may be dispensed with, and substrate 100 may be connected directly to the R.F. source through conductor 118.

Besides R.F. sputter etching, as shown in FIGS. 1 and 1a, ion sputter etching, as shown in FIG. 2, may also be employed for transferring a recorded hologram to a hard durable substrate material.

Referring now to FIG. 2, the apparatus for ion sputter etching comprises bell jar 200, in which is located a target comprising substrate 202 covered by layer 204. Layer 204 has a hologram recorded therein. Located above layer 204, in spaced relationship therewith, is ion gun 206, which consists of an insulating cylindrical member 208 for supporting at the top end thereof anode electrode 210 and at the bottom end thereof cathode electrode 212. Anode electrode 210, as well as base 214, are connected to ground potential, and cathode electrode 212 is connected to a suitable point of negative D.C. potential in the range between −3 kv.−6 kv. An inert gas, such as argon, is supplied to ion gun 206 through a hole in outer electrode 210 by tube 216. Cathode electrode 212 is a grid-like structure having a plurality of holes, which permit downward-moving, high kinetic energy ions, produced by the large voltage gradient between the electrodes of ion gun 206, to bombard layer 204.

Located in the vicinity between ion gun 206 and substrate 202 is charge neutralizing filament 218, which is connected to a relatively low negative potential with respect to ground potential. Filament 218 is electrically heated by means not shown to thermionically emit electrons. Bell jar 200 is coupled to a vacuum pump through a hole in base plate 214 by tube 220.

The R.F. sputter etching apparatus shown in FIGS. 1 and 1a and the ion sputter etching apparatus shown in FIG. 2 are broadly old in the sputtering art. Therefore, only a brief description of the general operation thereof will be given.

Referring back to FIG. 1, the R.F. voltage applied between substrate 100 and counterelectrode 106 will cause a glow discharge, in the low pressure inert gas, such as argon, therebetween. During the portion of each R.F. cycle when substrate 100 is relatively negative with respect to counter electrode 106, positive gas ions will be attracted to substrate 100 and layer 102. Similarly, during the portion of each R.F. cycle when substrate 100 is relatively positive with respect to counterelectrode 106, electrons will be attracted to substrate 100 and layer 102. However, because an electron is so much lighter than an ion and, hence, has a much lower inertia, the mobility of electrons is much greater than that of ions. Since the frequency of the R.F. source is many mHz., such as 13.56 mHz., many more electrons will reach substrate 100 in layer 102 during the short time interval of a positive half cycle of the applied R.F. voltage than the number of ions which reach substrate 100 and layer 102 during a negative half cycle of the applied R.F. voltage. This results in a net negative charge building up on substrate 100 and layer 102, which due to the presence of capacitance 114, cannot readily be discharged. This negative charge biases substrate 100 at a negative potential with respect to counterelectrode 106, and results in substrate 100 remaining negative for a portion of each R.F. cycle substantially in excess of one-half cycle, so that it becomes positive with respect to counterelectrode 106 only for a small portion of each R.F. cycle in the immediate vicinity of the peak positive amplitude of that cycle. Therefore, during nearly all of each R.F. cycle substrate 100 and layer 102 are bombarded by high kinetic energy gas ions, causing sputter etching to take place.

The reason for employing capacitance 116 in FIG. 1 is to prevent leakage of the accumulated negative charge on substrate 100, which would take place if substrate 100 is composed of a conducting material and capacitance 114 were absent. However, in the case where substrate 100 is composed of an insulating material, the presence of capacitance 114, although permissible, is not essential to prevent leakage of charge from substrate 100. Thus, in FIG. 1a, where an insulating substrate material is employed, capacitance 114 may be dispensed with.

Ion sputter etching is also capable of sputter etching both conducting and insulating substrates. In operation, the apparatus of FIG. 2 employs ion gun 206 to eject a plurality of high kinetic energy, downward-moving, ions of inert gas from the openings in cathode electrode 212. Substrate 202 and layer 204 are situated so that a large majority of these ejected ions bombard the exposed surface of substrate 202 and layer 204 facing ion gun 206. The arrival of these ions has the tendency to positively charge substrate 202 and layer 204. However, the electrons emitted by charge neutralizing filament 218 effectively prevent any accumulation of net charge on either substrate 202 or layer 204.

The method of making a hologram in hard durable material, employing R.F. sputter etching or ion sputter etching apparatus of the type shown in FIGS. 1, 1a or 2, will now be considered.

A selected hard object (which for illustrative purposes will be assumed to be a glass) is first coated with a uniform thickness of photoresist film which should be as thin as possible. For instance, the photoresist may be a Shipley photoresist having a thickness of between 3,000 and 5,000 angstroms. It is desirable to bake the resist for a suitable time, such as ten minutes, and at a suitable temperature, such as 80° C., prior to the exposure of the photoresist to interfering components of coherent laser light, one of which may be spatially modulated in accordance with object information, as is well known in the hologram art. By such exposure, a latent image of the hologram is recorded on the photoresist.

In each of several experiments, the exposure time was varied to different values (such as 20 to 240 seconds) with a given power He-Cd laser (such as 120 milliwatts). Therefore, upon the development of the photoresist, the holographic record was imprinted into the resist, as a relief pattern, to variable depths. For the shortest exposure, the hologram in the resist was barely discernible, whereas for the longest exposure removal of the resist down to the surface of the glass substrate was evident. After development, the resist was baked again for a suitable period of time, such as ten minutes, at a suitable temperature, such as 80° C. The purpose of baking the photoresist both before and after exposure and development was to increase its resistance to sputter etching, so that its rate of sputter etching would be slower than would be the case if this baking has not taken place. At this point, the photoresist hologram was ready for sputter etching, which was accomplished by the R.F. sputter etching apparatus of the type shown in FIG. 1 and 1a.

FIG. 3a is a schematic diagram of a cross section of the recorded hologram prior to etching. As shown, medium 300 in which it is desired to record the hologram, (which for illustrative purposes has been assumed to be glass) is covered with layer 302 of developed photoresist which has a hologram recorded therein. Photoresist 202, as shown, is a positive photoresist, so that the end portions thereof, A and B respectively, which were covered by a mask during the exposure of the hologram, have the greatest thickness. The recorded hologram itself comprises spatial waves composed of crests and valleys. The thickness of photoresist 202 corresponding to a crest, although somewhat smaller than the unexposed thicknesses A and B, is still substantially thicker than the thickness of photoresist 302 corresponding to the respective valleys of photoresist 302, as shown in FIG. 3a. Thus, the recorded hologram is in the form of a relief pattern, in which the object information is manifested by both a spatial wavelength (having a certain phase) and spatial amplitude of the recorded hologram. (For illustrative purposes, both the spatial wavelength and spatial amplitude are schematically shown in FIG. 3a in greatly exaggerated size. In reality, the spatial wavelength is in the order of 1 micron, while the spatial amplitude may be in the order of only a fraction of a micron.)

Since the substrate is assumed to be glass, an insulator R.F. sputter etching thereof can be accomplished with equal effect by the apparatus of either FIG. 1 or FIG. 1a. In actual experimental cases, an argon gas pressure of 5 microns is employed with an R.F. power density of 0.8 w./cm.$^2$. The time duration of the etching was varied from case to case from 15 minutes to 40 minutes. It was found that the sputter etching of the resist surface proceeded at a relatively constant rate at each point of the surface so that the valleys of the recorded hologram in FIG. 3a reached the glass surface first, whereupon the glass in cooperative relationship therewith began to be etched.

Figure 3B:
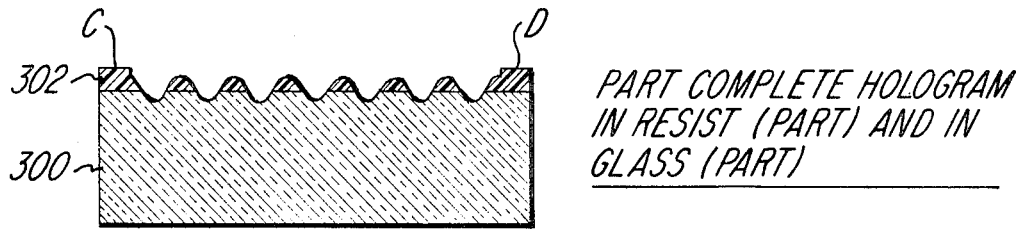

FIG. 3b shows an intermediate point in the sputter etching where the portions of the recorded hologram manifested by the respective valleys have been transferred to the glass substrate, but the portions of the recorded hologram manifested by the respective crests still remain in the photoresist. Further, by comparing FIG. 3b to FIG. 3a, it will be seen that the sputter etching has reduced the depth of end portions C and D of the photoresist layer in FIG. 3b with respect to the depth of end portions A and B of the photoresist layer in FIG. 3a.

Figure 3C:
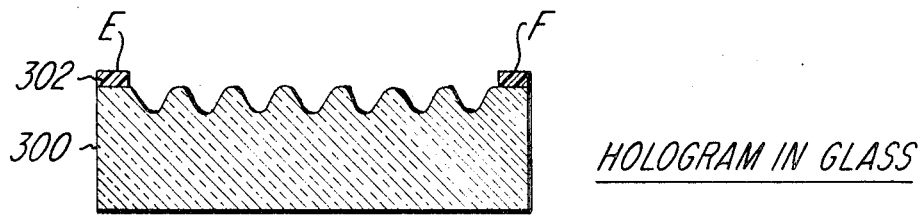

As the sputter etching proceeds further, the time arrives when all the crests of the recorded hologram reach the glass surface, as shown in FIG. 3c. At this point, all of the photoresist layer corresponding to the recorded hologram has been sputtered away and the entire recorded hologram has been transferred to the underlying glass substrate, as shown in FIG. 3c. However, as is also shown in FIG. 3c, a certain amount of photoresist remains at end portions E and F, corresponding to those portions of the original photoresist layer which has been masked at the time the photoresist was exposed.

It has been found that the three-dimensional definition of the transferred recorded hologram in the glass substrate is preserved (although the relative amplitude of the respective crests and valleys in the glass may be somewhat less than, substantially the same, or somewhat greater than the corresponding amplitudes of the recorded hologram in the photoresist depending upon whether the effective sputtering rate of the glass is less than, substantially the same or greater than the effective sputtering rate of the photoresist).

The onset of glass etching can be seen by the appearance of a yellow orange glow (apparently due to sodium) over the hologram surface. The sputter etching is then terminated either after no further changes in the glow appearance takes place or after about 500 to 1,000 angstroms of the glass have been removed (as estimated from the previously determined glass etching rate). In practice, it was found that the amplitude of the hologram image in the glass was, in fact, somewhat smaller than in the photoresist, because the etching rate of the glass was somewhat smaller than that of the photoresist.

Since the diffraction efficiency of a hologram during readout increases with greater amplitude of the hologram image, is desirable that the etching rate of the photoresist be decreased with respect to the etching rate of the glass, so that it is more equal to that of the glass, or, even better, that it be made somewhat smaller than that of the glass, so that the transferred amplitude of the hologram image in the glass will be even greater than that of the original image in the photoresist. Qualitative results indicate that an increase in the baking time of the photoresist after development decreases its sputter etch rate significantly and, by nearly matching the etching rates in this manner, an increase in the efficiency of the glass holograms can be obtained.

The best glass holograms were obtained with the longer exposure resist images so that the resist image was only a few hundred angstroms thick. The thicker the resist image, the poorer the efficiency of the final glass hologram. Another factor was the depth to which the glass was etched. It appears that the optimum end point for stopping the glass etching would be just after the disappearance of the resist image. By terminating at this point, a maximum hologram efficiency of 10–15 percent was realized, as compared to the efficiency of 15–20 percent of the original resist hologram. Since normally the glass holograms were slightly over etched, the effect of over etching was examined. After etching of an additional 2500 angstroms of glass from a hologram a loss of less than a half in efficiency was qualitatively observed, whereas after 12,000 angstroms etching the hologram retained about one-tenth of its original efficiency.

The remaining photoresist at E and F in FIG. 3c can be conveniently removed by R.F. etching in oxygen gas for two or three minutes.

In most of the experiments which were conducted, ordinary slide glass was used. However, any glass or ceramic material, provided it is smooth and dense, can be used. Some examples are borosilicate glasses, silicate glasses, fused quartz, magnesium oxide, sapphire, silicon, etc. It was found that glasses, due to their amorphous and dense structure will reproduce high fidelity true images of the original photoresist.

In addition to employing glass or ceramic material, similar etching was attempted with smooth sputtered nickel film deposited on glass, and bulk stainless steel. It was found that in the case of the nickel film, although a pronounced hologram was transferred, the image was grainy due to small nickel crystallites in the film. In the case of the bulk stainless steel, the transferred hologram etched therein was better than in the sputtered nickel. However, it also contained defects such as pores, grain boundaries, etc.

The transferred holograms in both the glass substrates and the metal substrates could be easily replicated into plastics, by pressing, for instance.

Although in the experiments described above, sputter etching was accomplished by the R.F. techniques employed in the type of apparatus of FIGS. 1 and 1a, it is well known in the art that ion sputter etching, which is accomplished by the type of apparatus shown in FIG. 2, is equally capable of sputter etching conductor materials, such as metals, and insulator materials, such as glass, ceramic and photoresist. Therefore, ion sputter etching can be employed to practice the present invention.

In the experiments described above, the photosensitive material in which the hologram was originally recorded was a layer of exposed and developed photoresist, so that the recorded hologram to be transferred was already in the form of a relief pattern. However, this is not essential. Any photosensitive etchable material which produces regions of different refractive indices or even regions of different optical density upon exposure to holographic information followed by development thereof, and has a sputter etching rate which varies from point to point as a function of the value of refractive index or optical density at that point, can also be used. The reason for this is that due to the difference in etching rates, the transferred hologram etched into the target substrate will still be a relief pattern phase hologram even though the original recorded hologram is not a relief pattern.

Although the present invention has been described in connection with the transfer of a recorded hologram image to a substrate composed of a hard durable material, it is apparent that it is equally applicable to the transfer of any other fine detail relief pattern to such a substrate with the same high fidelity and high resolution capabilities as that which are obtained in the transfer of a recorded hologram image.

What is claimed is:

1. A method for sputter etching a predetermined relief pattern on a given area of the surface of a given solid material, wherein said predetermined relief pattern is defined by a two-dimensional complex spatial wave having a variable amplitude over said given area, wherein the amplitude of said complex spatial wave at any point of said given area is manifested by the depth at that point of said relief pattern with respect to the unetched portion of said surface, and wherein said complex spatial wave includes at least one component having a spatial wavelength no greater than the order of one micron and having an amplitude manifested by a depth no greater than in the order of one micron; said method comprising the steps of covering said given area with a smooth layer of a given photosensitive recording material, exposing the surface of said layer of recording material to light energy spatially modulated in accordance with said two-dimensional complex spatial wave and thereafter developing said exposed recording material to thereby record thereon said two-dimensional complex spatial wave in at least one of first and second different forms, wherein the first form consists of a relief pattern in the exposed surface of said recording material corresponding with said predetermined relief pattern and the second form consists of a value of resistance to being sputter etched at each point of the exposed surface of said layer which corresponds with the value of exposure to light energy experienced by that point during said recording, and then sputter etching in order first said developed layer of recording and then the underlying given area of the surface of said given solid material to effect the transfer of said entire recorded complex spatial wave from said layer to said given area of the surface of said given solid material, thereby obtaining said predetermined relief pattern.

2. The method defined in claim 1, wherein said first-named step consists of covering said given area with a smooth layer of a given photoresist, whereby said recording has said first form.

3. The method defined in claim 2, wherein said first-named step consists of covering said given area with a smooth layer having a thickness between 3,000 and 5,000 angstroms.

4. The method defined in claim 3, wherein the amount of exposure experienced by the exposed surface of said layer during the occurrence of said second-named step is such that the maximum thickness of said exposed surface after development thereof is no greater than a few hundred angstroms.

5. The method defined in claim 1, further including the step of baking said layer intermediate the occurrence of said first and second named steps.

6. The method defined in claim 5, wherein said given photosensitive recording material is a photoresist, and wherein the step of baking consists of baking said layer at substantially 80° C. for substantially 10 minutes.

7. The method defined in claim 1, further including the step of baking said layer intermediate the occurrence of said second and third named steps.

8. The method defined in claim 7, wherein said given photosensitive recording material is a photoresist, and wherein the step of baking consists of baking said layer at substantially 80° C. for substantially 10 minutes.

9. The method defined in claim 1, wherein said third-named step comprises the step of R.F. sputter etching.

10. The method defined in claim 1, wherein said third-named step comprises the step of ion sputter etching.

References Cited
UNITED STATES PATENTS

| | | | |
|---|---|---|---|
| 3,585,121 | 6/1971 | Franks et al. | 204—192 |
| 3,474,021 | 10/1969 | Davidse et al. | 204—192 |

JOHN H. MACK, Primary Examiner

S. S. KANZER, Assistant Examiner

U.S. Cl. X.R.

350—3.5; 204—298